US009647439B1

(12) United States Patent
Gretz et al.

(10) Patent No.: US 9,647,439 B1
(45) Date of Patent: May 9, 2017

(54) LIQUID-TIGHT AND CONCRETE-TIGHT FITTING FOR PVC JACKETED METAL-CLAD ELECTRICAL CABLE

(71) Applicant: Arlington Industries, Inc., Scranton, PA (US)

(72) Inventors: Thomas J. Gretz, Delray Beach, FL (US); Daniel J. O'Neil, Moscow, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 15/164,005

(22) Filed: May 25, 2016

Related U.S. Application Data

(63) Continuation-in-part of application No. 14/738,994, filed on Jun. 15, 2015, now Pat. No. 9,385,520.

(60) Provisional application No. 62/271,392, filed on Dec. 28, 2015.

(51) Int. Cl.
*H02G 3/08* (2006.01)
*H02G 15/00* (2006.01)
*H02G 15/013* (2006.01)
*H02G 3/22* (2006.01)
*H02G 3/06* (2006.01)

(52) U.S. Cl.
CPC ......... *H02G 15/013* (2013.01); *H02G 3/0625* (2013.01); *H02G 3/22* (2013.01)

(58) Field of Classification Search
CPC ...... H02G 3/00; H02G 3/0683; H02G 3/0658; H02G 3/081; H02G 3/0691; H02G 3/0675; H02G 3/083; H02G 3/0641; H02G 3/0616; H02G 15/068; H02G 3/06; H02G 15/013; H02G 3/22; H02G 3/0625; H01R 9/03; H01R 9/00; H01R 13/5205
USPC ...... 174/650, 652, 655, 660, 664, 68.1, 654, 174/153 R, 653, 651, 480; 285/149.1, 285/151.1, 154.1, 207, 249; 439/583, 578
See application file for complete search history.

(56) References Cited

U.S. PATENT DOCUMENTS

| 4,549,755 | A | | 10/1985 | Kot et al. | |
|---|---|---|---|---|---|
| 5,059,747 | A | * | 10/1991 | Bawa | H02G 3/0675 174/541 |
| 5,204,499 | A | | 4/1993 | Favalora | |
| 5,593,186 | A | | 1/1997 | Harris | |
| 5,866,853 | A | | 2/1999 | Sheehan | |
| 5,951,327 | A | * | 9/1999 | Marik | H01R 13/5205 439/607.44 |
| 6,034,325 | A | | 3/2000 | Nattel et al. | |
| 6,273,477 | B1 | | 8/2001 | Ohmi | |

(Continued)

*Primary Examiner* — Angel R Estrada

(57) ABSTRACT

A liquid-tight and concrete-tight electrical fitting for securing PVC jacketed metal clad (PVC-MC) electrical cable to an electrical box or panel. The electrical fitting includes a tubular fitting body having a threaded inbound and outbound end, an MC ring, a grommet, a bushing, a sealing ring, a locknut, and a gland nut. The grommet includes an inbound end with a conical outer surface and an outbound end with a flat abutment surface. A conical inner surface is provided on the bushing for engaging the conical outer surface of the grommet. The MC ring is a continuous ring including an inbound end, an outbound end, a ring portion, and one or more fingers extending from the ring portion. The fitting facilitates liquid-tight and concrete-tight connection and proper electrical grounding of PVC-MC cable to an electrical box or panel.

20 Claims, 17 Drawing Sheets

(56) References Cited

U.S. PATENT DOCUMENTS

| | | | |
|---|---|---|---|
| 6,450,550 B1 | 9/2002 | Cornwell | |
| 6,538,201 B1 | 3/2003 | Gretz | |
| 6,767,032 B1 | 7/2004 | Gretz | |
| 7,080,859 B1 | 7/2006 | Gretz | |
| 7,431,343 B2 * | 10/2008 | Chiu | H02G 3/0691 174/655 |
| 8,563,876 B1 * | 10/2013 | Gretz | H02G 3/083 174/541 |
| 8,586,881 B1 * | 11/2013 | Shemtov | H02G 3/0675 174/652 |
| 8,657,626 B2 * | 2/2014 | Duval | H01R 13/5205 439/583 |

* cited by examiner

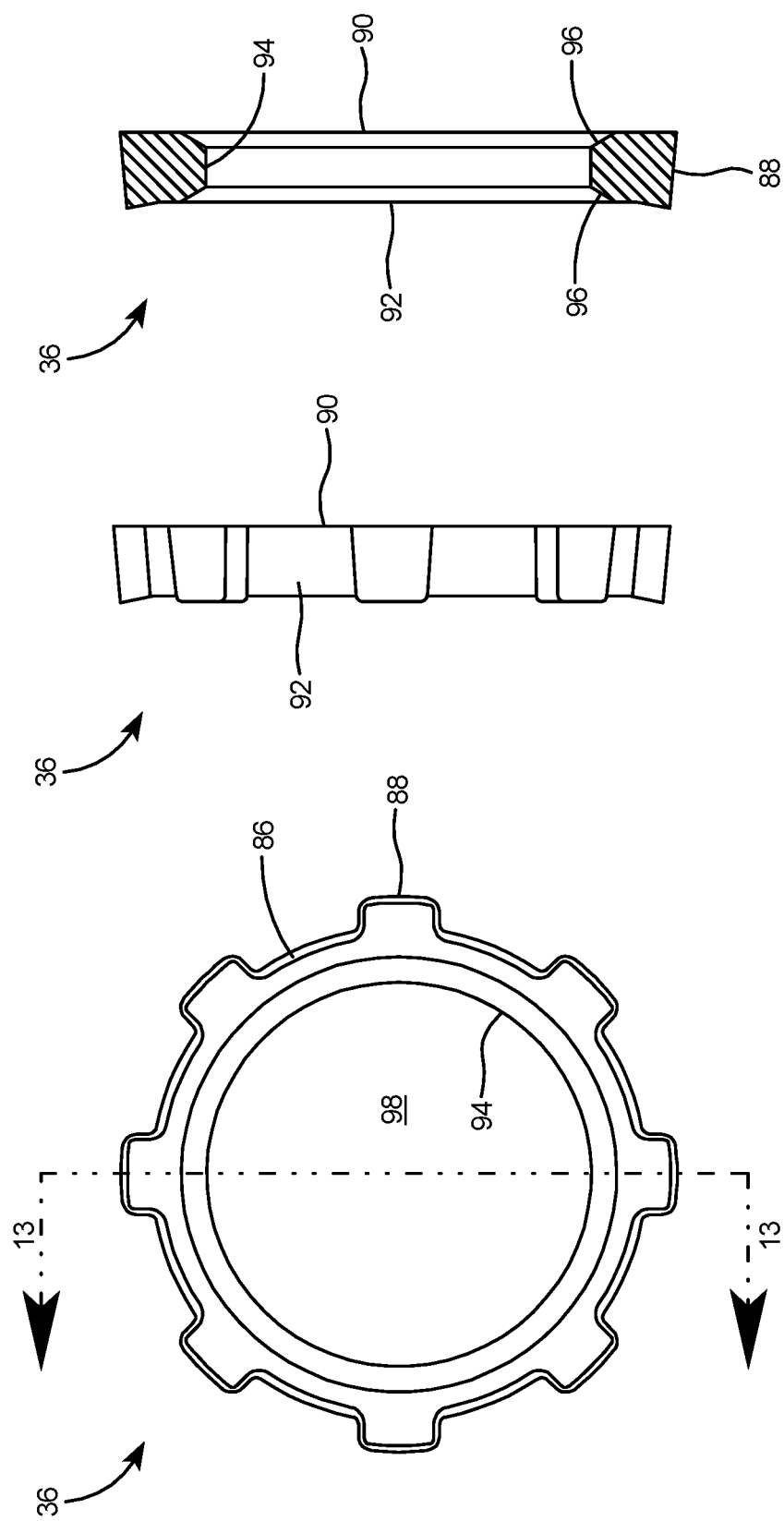

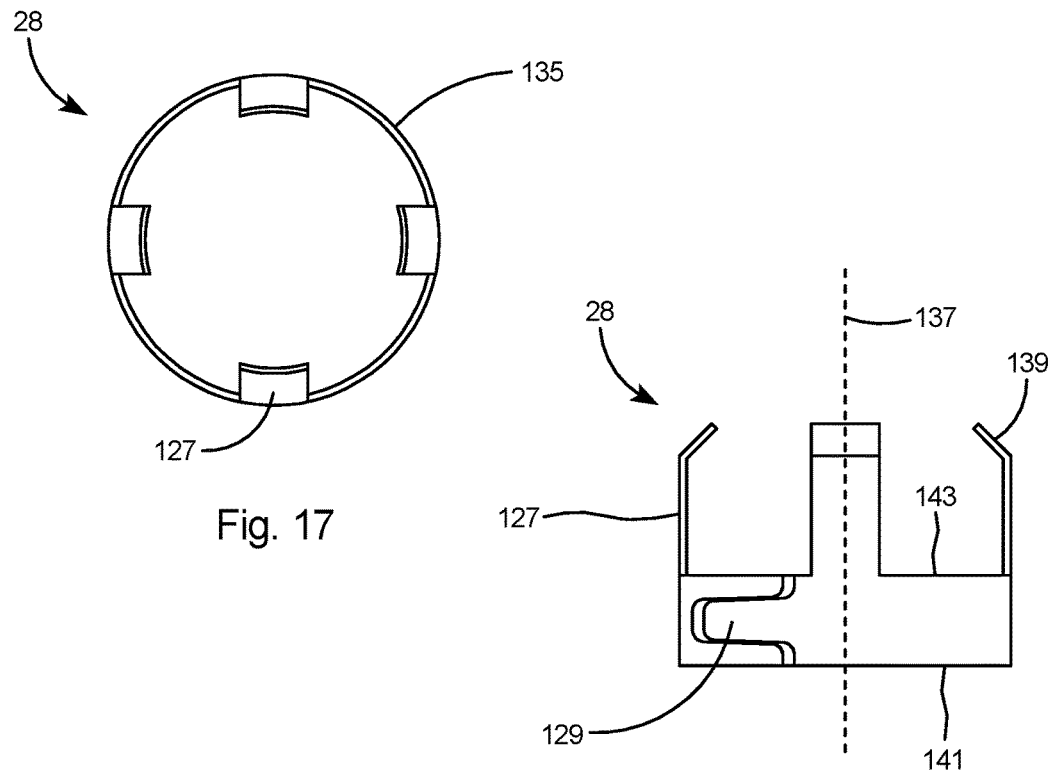
Fig. 17
Fig. 18
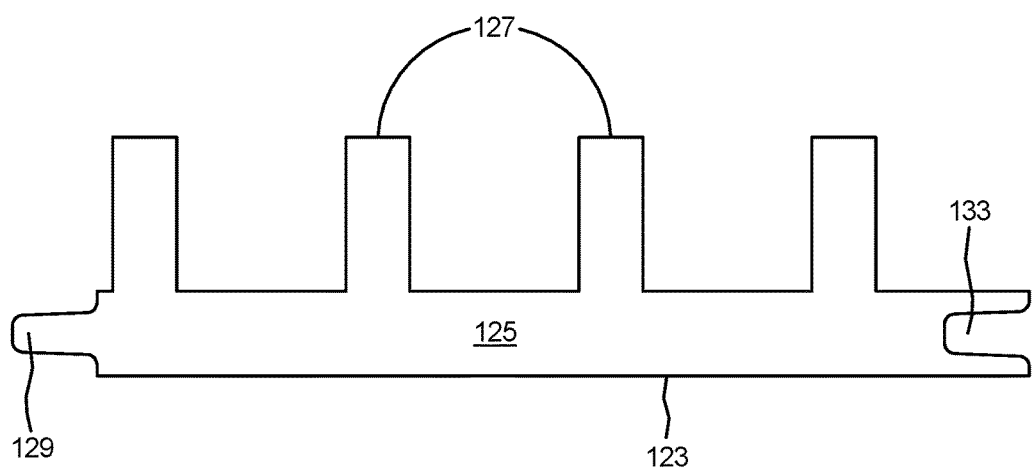
Fig. 19

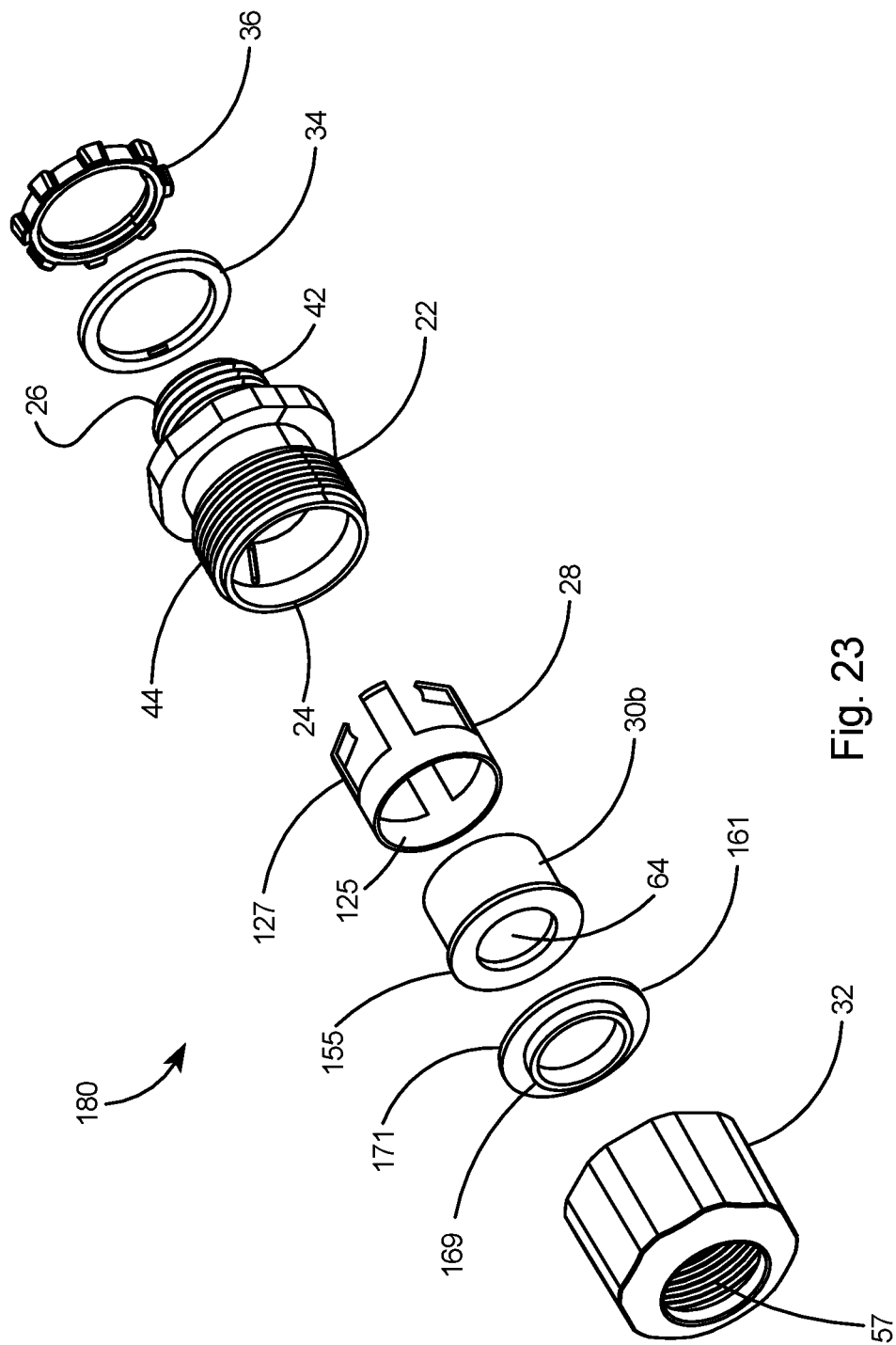

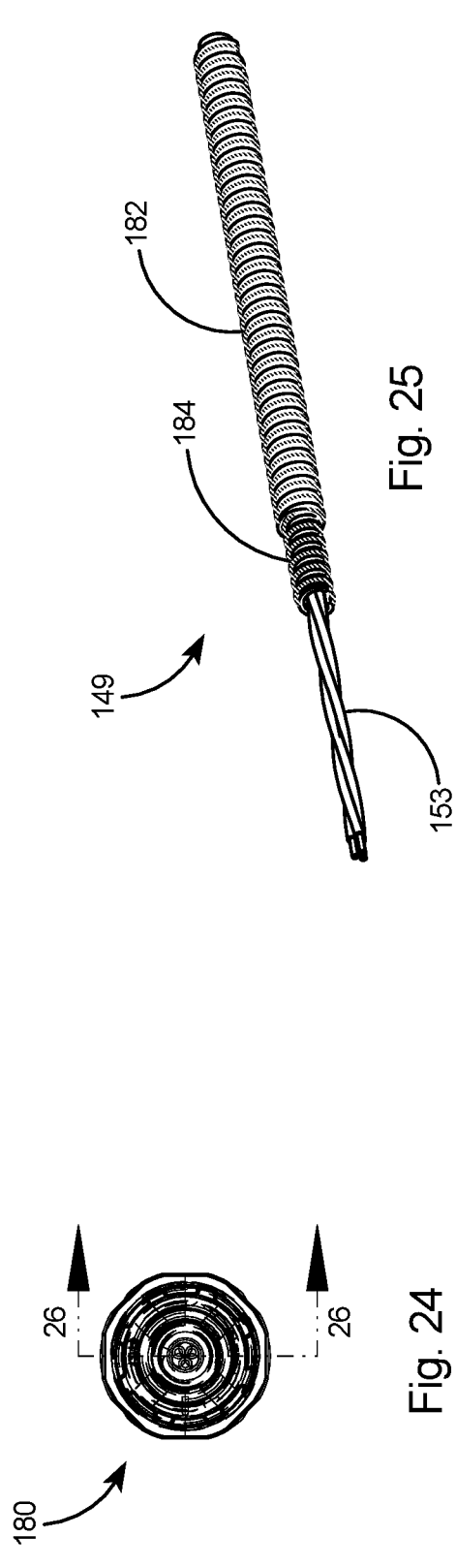

LIQUID-TIGHT AND CONCRETE-TIGHT FITTING FOR PVC JACKETED METAL-CLAD ELECTRICAL CABLE

CROSS-REFERENCE TO RELATED APPLICATIONS

This application claims priority to provisional U.S. Application No. 62/271,392, filed Dec. 28, 2015, and this application is a Continuation-In-Part of U.S. patent application Ser. No. 14/738,994 filed Jun. 15, 2015 and still pending, the entire contents of which is incorporated herein by reference.

FIELD OF THE INVENTION

This invention relates to electrical fittings or connectors for connecting electrical cables to a panel and specifically to a liquid-tight and concrete-tight fitting for connecting PVC jacketed metal-clad electrical cable to an electrical box or panel.

BACKGROUND OF THE INVENTION

PVC jacketed metal-clad (PVC-MC) electrical cable is commonly used for conducting electrical supply in homes and residential buildings. PVC-MC cable typically includes a plurality of internal conductors within an interlocked conductive armor layer covered by an outer jacket of PVC (polyvinyl chloride). The armor in many cases may serve as the grounding path for the cable.

U.S. patent application Ser. No. 14/738,994, filed Jun. 15, 2015, and sharing common ownership with the present invention, disclosed an electrical fitting that facilitated rain-tight connection and proper electrical grounding of PVC-MC cable to an electrical box or panel.

Although the parent application provided a rain-tight electrical fitting with improved features for connecting PVC-MC cable to an electrical box, PVC-MC electrical cable is also rated for installation in concrete, which rating requires a fitting that is liquid-tight and concrete-tight. Accordingly, in the connection of PVC-MC cable to an outdoor electrical box, it is important to achieve both a liquid-tight connection and a concrete-tight connection while at the same time achieving a proper grounding path between the armor shell and the electrical box.

BRIEF SUMMARY OF THE INVENTION

The current invention is a liquid-tight and concrete-tight electrical fitting for securing PVC jacketed metal clad (PVC-MC) electrical cable to an electrical box or panel. The electrical fitting includes a tubular fitting body having a threaded inbound and outbound end, an MC ring, a grommet, a bushing, a sealing ring, a locknut, and a gland nut. The grommet includes an inbound end with a conical outer surface and an outbound end with a flat abutment surface. A conical inner surface is provided on the bushing for engaging the conical outer surface of the grommet. The MC ring is a continuous ring including an inbound end, an outbound end, a ring portion, and one or more fingers extending from the ring portion. The fitting facilitates liquid-tight and concrete-tight connection and proper electrical grounding of a wide range of PVC-MC cables to an electrical box or panel.

Objects and Advantages

A first object of the current invention is to provide an electrical fitting that enables liquid-tight and concrete-tight connection of PVC jacketed metal-clad electrical cable to an electrical box or panel.

A second object of the invention is to provide an electrical fitting that creates secure grounding of PVC-MC electrical cable to the fitting and to an electrical box or panel.

A further object of the invention is to provide a liquid-tight and concrete-tight electrical fitting that can accommodate a wide range of cable sizes.

BRIEF DESCRIPTION OF THE SEVERAL VIEWS OF THE DRAWING(S)

Reference is made herein to the accompanying drawings, which are not necessarily drawn to scale, and wherein:

FIG. 11 is an elevation view of a locknut which forms a portion of the fitting of FIG. 1.

FIG. 12 is a side view of the locknut.

FIG. 13 is a sectional view of the locknut taken along line 13-13 of FIG. 11.

FIG. 17 is an elevation view of an MC ring which forms a portion of the fitting of FIG. 1.

FIG. 18 is a side view of the MC ring.

FIG. 19 is a plan view of a blank that is used to form the MC ring.

FIG. 23 is an exploded isometric view of a second embodiment of a fitting for PVC-MC cable in accordance with embodiments of the invention.

FIG. 24 is an end view of the electrical fitting with an electrical cable inserted therein.

FIG. 25 is an isometric view of a PVC-MC electrical cable with an end portion of the PVC jacket stripped off the cable.

FIG. 26 is a sectional view of the electrical fitting taken along line 26-26 of FIG. 24.

DETAILED DESCRIPTION

Figure 1:
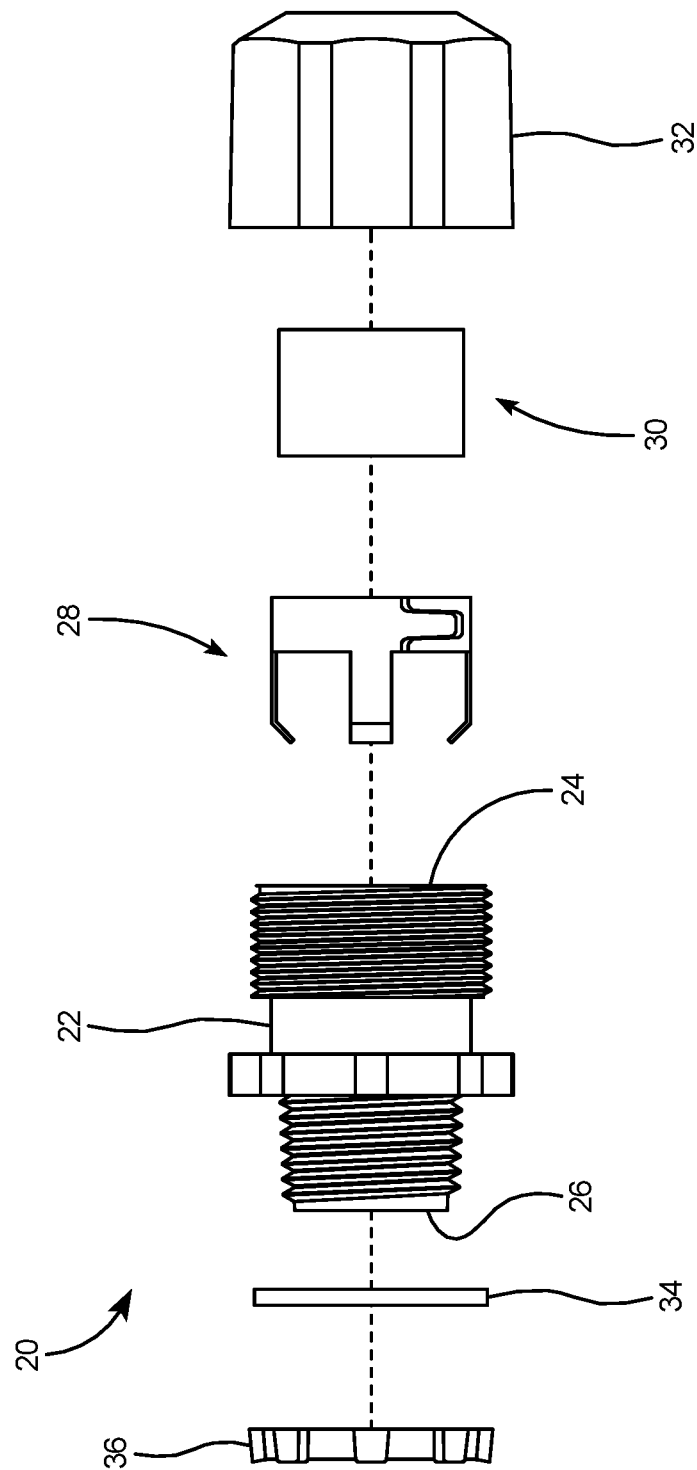
FIG. 1 is an exploded side view of a fitting for a PVC-MC cable in accordance with embodiments of the invention.

The present invention is an electrical fitting for PVC jacketed Metal Clad (PVC-MC) electrical cable. As shown in FIG. 1, the electrical fitting 20 includes a fitting body 22 having an inbound end 24 and an outbound end 26. The fitting includes an MC ring 28 and a grommet 30 secured to the inbound end 24 by a gland nut 32 and a sealing ring 34 that will be secured to the outbound end 26 by a locknut 36 after the outbound end is connected to an electrical panel or electrical box (not shown).

Figure 2:
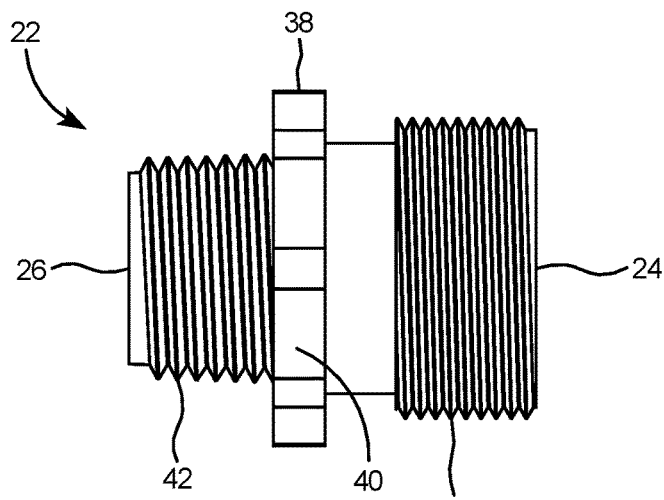
FIG. 2 is a side view of a body member which forms a portion of the fitting of FIG. 1.
Figure 3:
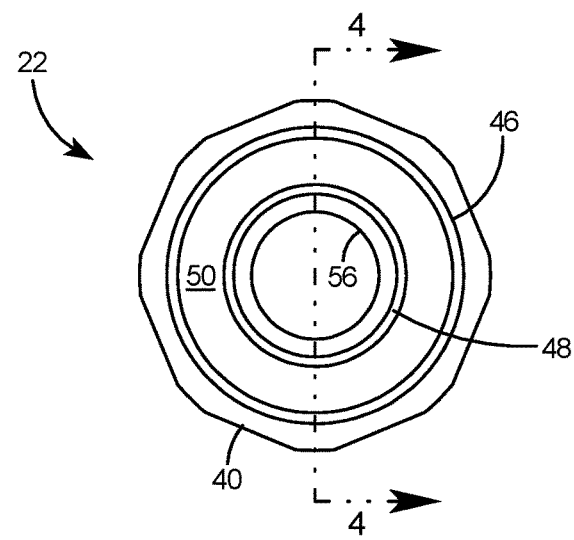
FIG. 3 is an end view of the body as taken from the right side of FIG. 2.
Figure 4:
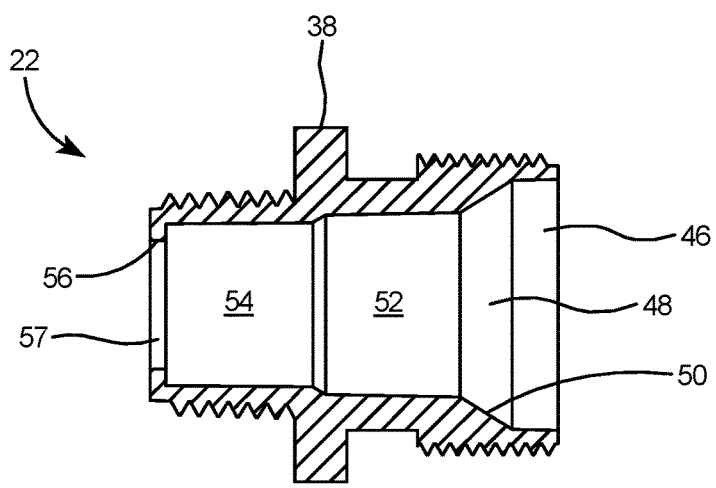
FIG. 4 is a sectional view of the body taken along line 4-4 of FIG. 3.

Referring to FIGS. 2-4, the fitting body 22 includes a central flange 38 with flat surfaces or facets 40 thereon enabling gripping by a wrench or similar tool, a threaded nose portion 42 extending from the outbound end 26 and a threaded tubular portion 44 at the inbound end 24.

As shown in FIG. 4, the fitting body 22 includes an inbound channel 46 at the inbound end 24, a necked-down channel 48 formed by a ramped surface 50 circumscribing the interior of the body, an inner channel 52 having an inner diameter smaller than that of the inbound channel 46, and an outbound channel 54 at the outbound end 26. The body 22 includes a lip 56 circumscribing the interior of the body at the outbound end and defining an opening 57 therein.

Figure 5:
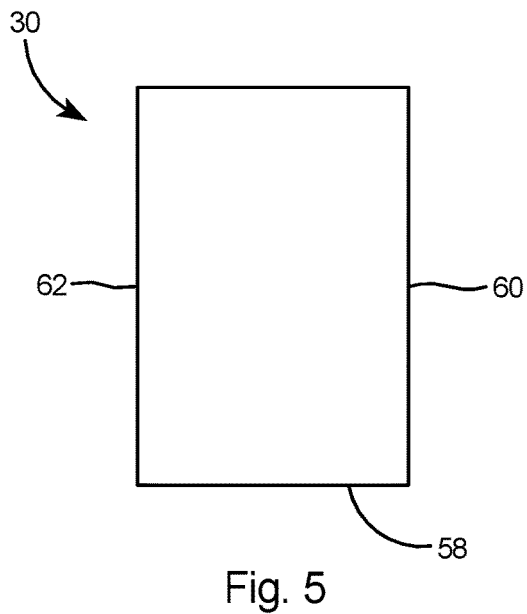
FIG. 5 is a side view of a grommet which forms a portion of the fitting of FIG. 1.
Figure 6:
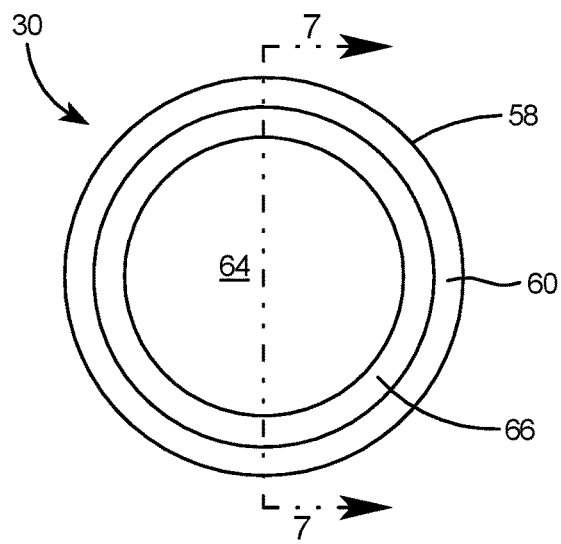
FIG. 6 is an end view of the grommet.
Figure 7:
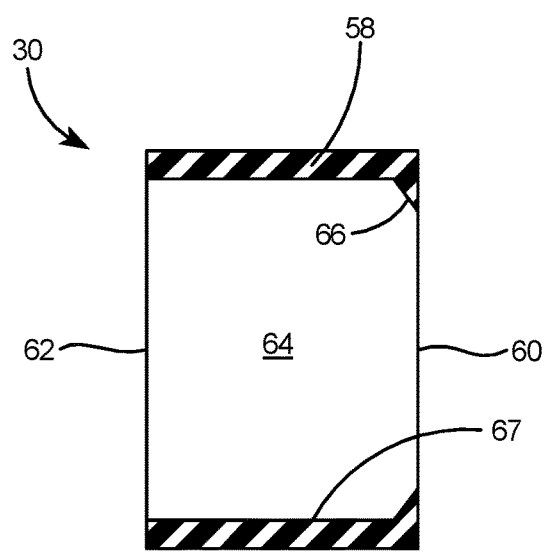
FIG. 7 is a sectional view of the grommet taken along line 7-7 of FIG. 6.
Figure 8:
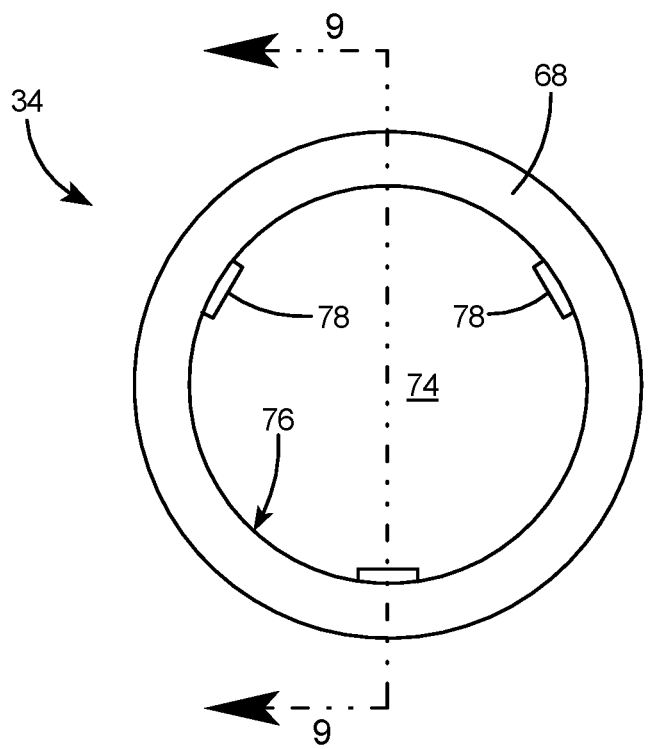
FIG. 8 is a side view of a sealing ring which forms a portion of the fitting of FIG. 1.
Figure 9:
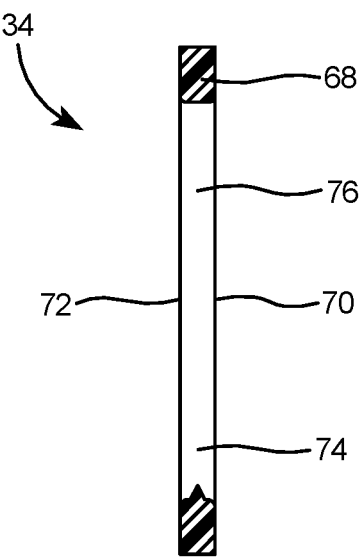
FIG. 9 is a sectional view of the sealing ring taken along line 9-9 of FIG. 8.
Figure 10:
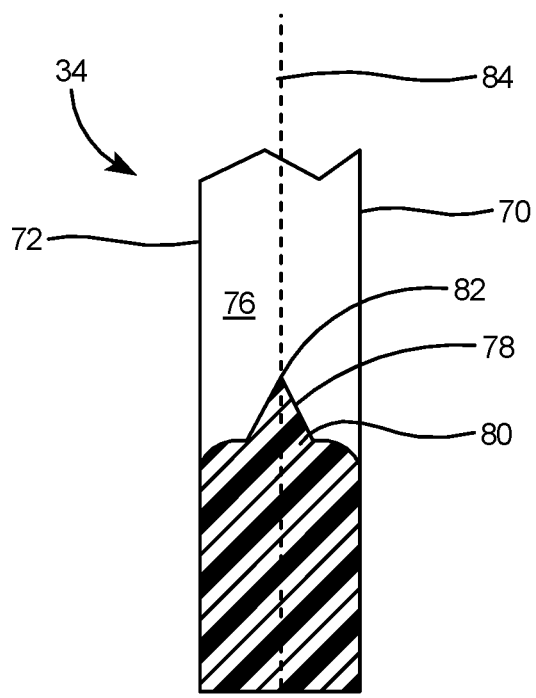
FIG. 10 is an expanded view of a portion of the sectional view along line 9-9 of FIG. 8.

With reference to FIGS. 5-7, the grommet 30 is substantially cylindrical shaped and includes a body 58 having an inbound end 60, an outbound end 62, and a central bore 64 there through. A lip 66 extends inward from the inner periphery 67 of the grommet 30 at the inbound end. As shown in FIG. 7, the lip 66 is triangular-shaped in cross-section. The grommet is preferably constructed of elastomeric material. Most preferably it is molded in one piece of SANTOPRENE®, a synthetic rubber elastomeric material available from Monsanto Company Corporation of St. Louis, Mo.

Referring to FIGS. 8-11, the sealing ring 34 includes a torus-shaped body 68 with an inbound end 70, an outbound end 72, and a central bore 74 formed by a circular inner surface 76 on the sealing ring. Three thread engagement tabs 78 extend from the circular inner surface 76 of the sealing ring. Each of the tabs 78 include a base 80 and rise to a sharp point or apex 82 that is aligned along the central axis 84 of the sealing ring 34. The sealing ring 34 is preferably constructed of a plastic material. Most preferably it is molded in one piece of Dow 993/NT, a linear polyethylene (LPE) material available from Dow Chemical Company of Midland, Mich.

Referring to FIGS. 11-13, the substantially tubular locknut 36 includes an outer surface 86 and a plurality of lugs 88 extending from the outer surface. The locknut 36 further includes an inbound end 90, and outbound end 92, and an inner surface 94. A chamfered surface 96 is provided around the inner periphery of the inner surface 94 at both the inbound end 90 and outbound end 92. As a result of the chamfered surfaces 96, the outer surface 86 is wider than the inner surface 94. The locknut 36 includes an opening 98 therein. Preferably, the locknut is formed in one piece of metal. Most preferably, the locknut is molded of zinc alloy.

Figure 14:
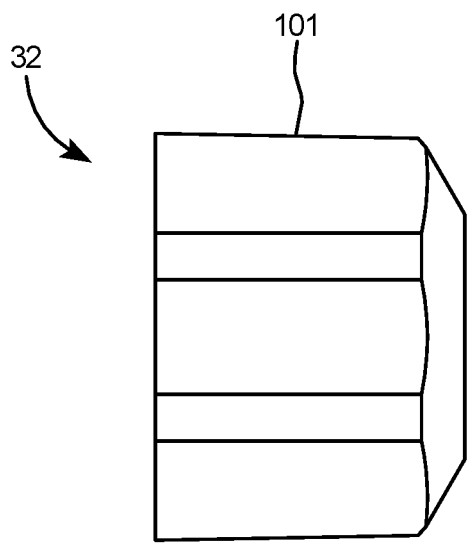
FIG. 14 is a side view of a nut which forms a portion of the fitting of FIG. 1.
Figure 15:
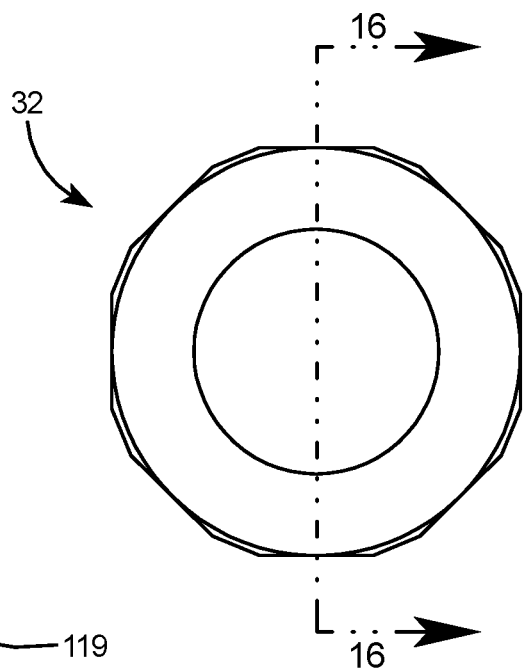
FIG. 15 is an end view of the nut.
Figure 16:
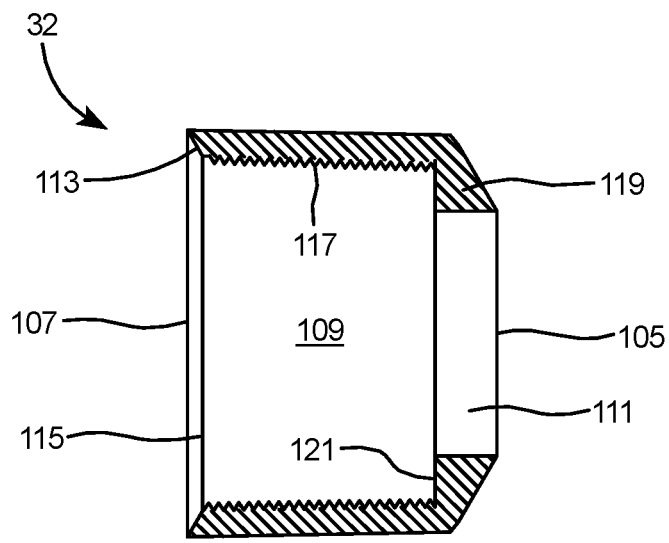
FIG. 16 is a sectional view of the nut taken along line 15-15 of FIG. 15.

With reference to FIGS. 14-16, the gland nut 32 includes an outer periphery 101 and a plurality of flat surfaces 103 for enabling gripping by a wrench or similar tool. The gland nut 32 further includes an inbound end 105 and an outbound end 107. The gland nut 32 includes a wide chamber 109 at the outbound end 107 and a through bore 111 at the inbound end 105. A chamfered surface 113 is provided around the interior periphery 115 at the outbound end of the nut. The interior surface of the nut at the outbound end 107 includes threads 117 thereon and a lip 119 with a flat engagement surface 121 thereon.

Referring to FIGS. 17-19, the MC ring 28 is created from a flat metal blank 123 including a base 125 and a plurality of fingers 127 extending from the base as shown in FIG. 19. The blank 123 includes a tab 129 on one end 131 and a groove 133 on the opposing end. The metal blank 123 is formed into a substantially cylindrical split ring 135 with a central axis 137 as shown in FIGS. 17 and 18. The fingers 127 include end portions 139 bent inwards or toward the central opening. The split ring 135 includes an inbound end 141 and an outbound end 143, with the fingers 127 extending from the outbound end 143.

Figure 20:
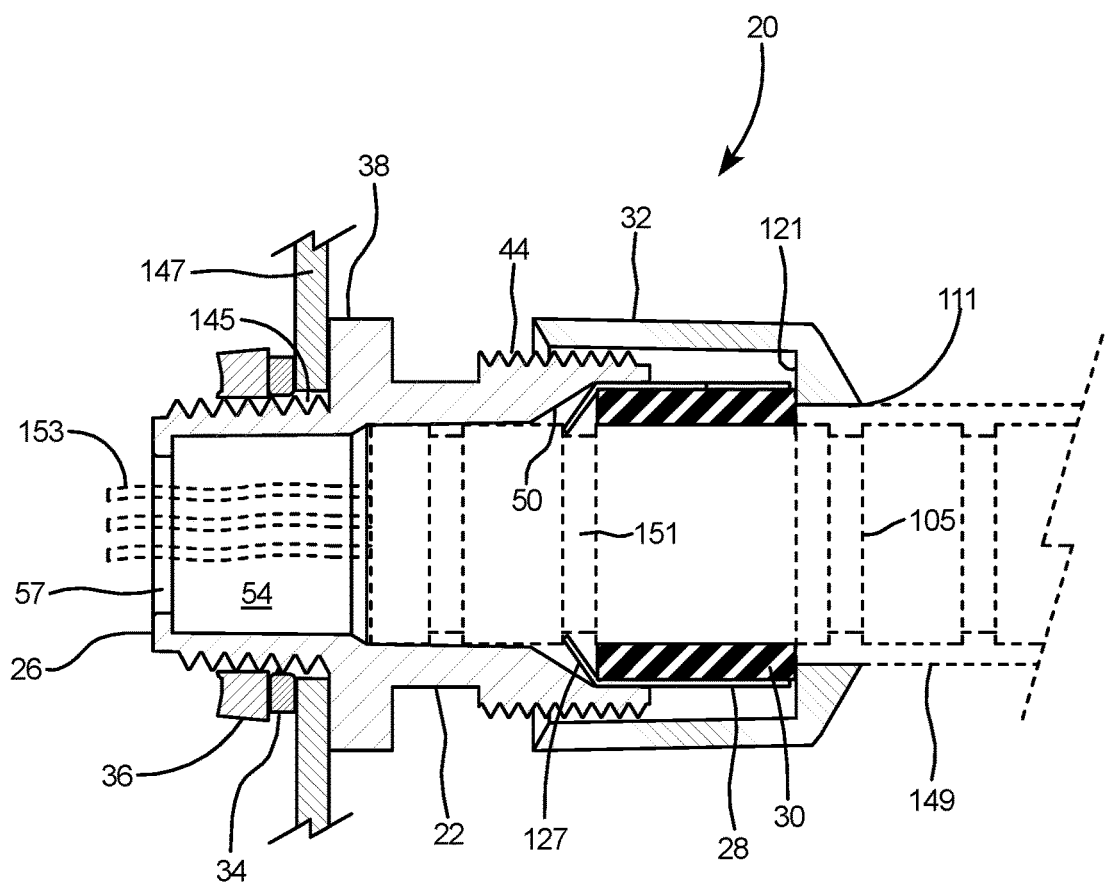
FIG. 20 is a sectional view of the electrical fitting assembled and connected to an electrical box with an electrical cable inserted therein.

Referring to FIG. 20, with the gland nut 32 partially threaded onto the fitting body 22, the electrical fitting 20 of the present invention is operated by inserting the outbound end 26 of the fitting body 22 through the knockout 145 of an electrical box 147. The sealing ring 34 is placed over the outbound end and the locknut 36 tightened thereon to secure the outbound end 26 of the fitting 20 to the electrical box 147. Central flange 38 of fitting body 22 limits the distance fitting 20 is inserted into the electrical box. The end portion of the PVC jacket is first stripped off the cable. PVC-MC cable 149 is then inserted through bore 111 at the inbound end 105 of the gland nut 32. The PVC-MC cable 149 inserts through fitting body 22 until fingers 127 of MC ring 28 are engaged by the ramped surface 50 of fitting body. Gland nut 32 is then tightened upon threaded tubular portion 44 of fitting body 22 and continued to be tightened until flat engagement surface 121 of gland nut 32 forces fingers 127 of MC ring 28 inward into grooves 151 of PVC-MC cable 149 and compresses grommet 30 until it deforms or molds around and envelops the cable 149. The deformed grommet 30 creates a rain-tight seal between the MC cable 149, the MC ring 28, and the gland nut 32. A rain-tight seal is further created at the threaded engagement of gland nut 32 with the threads 44 on fitting body 22. The inward bent fingers 127 of MC ring lock the electrical cable 149 to the inbound end 105 of the fitting 20 and the compressed sealing ring 30 creates a rain tight seal around the electrical cable. Conductors 153 from the electrical cable 149 pass easily through the outbound channel 54 and opening 57 at the outbound end 26 of the fitting body 22.

A critical feature of the electrical fitting 20 is the ability to create proper grounding of the MC cable 149 to the fitting body 22 and the fitting body to the electrical box 147 while the fitting at the same time creates a rain tight connection between the fitting 20 and the PVC-MC cable 149. The MC ring 28 is preferably constructed of spring steel to impart resiliency to the ring 28 and the fingers 127 extending therefrom. The fitting body 22, locknut 36, and gland nut 32 are preferably constructed of an electrically conductive metal. Preferably the fitting body, locknut, and gland nut are constructed of zinc alloy, stainless steel, or plated steel. Most preferably, the fitting body 22, locknut 36, and gland nut 32 are die-cast of zinc alloy. Thus, when the fitting 20 is fully assembled as shown in FIG. 20, the fingers 127 of the MC ring 28 securely grip the armor layer of the PVC-MC cable 149 while the MC ring is securely seated against the fitting body 22 and the gland nut 32. Furthermore, the locknut 36 is securely connected to the outbound end 26 of the fitting body 22 and the central flange 38 is securely held against the electrical box 147. Thus, a proper grounding path is established between the PVC-MC cable 149, the electrical fitting 20, and the electrical box 147 thereby creating electrical continuity between the cable, fitting, and the electrical box. The proper electrical continuity is established at the same time a rain tight connection is established between the electrical cable 149 and the fitting 20.

Figure 21:
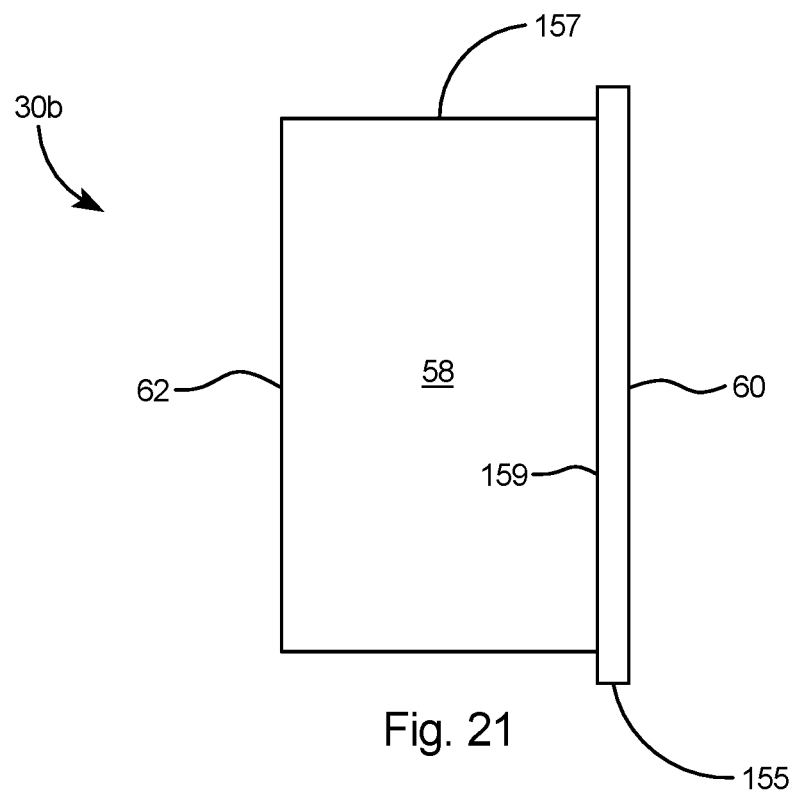
FIG. 21 is a side view of an alternate embodiment of a grommet according to the present invention.

With reference to FIG. 21, a second embodiment of the grommet 30b includes a tubular body 58 having an inbound end 60, an outbound end 62, and a central bore 64 (see FIG. 23) there through. A flange 155 extends outward from the outer periphery 157 of the grommet 30b at the inbound end 60. The flange 155 includes a ring engagement surface 159 which, as shown in FIG. 23, will engage the MC ring 28 in the assembly of the rain tight fitting.

Figure 22:
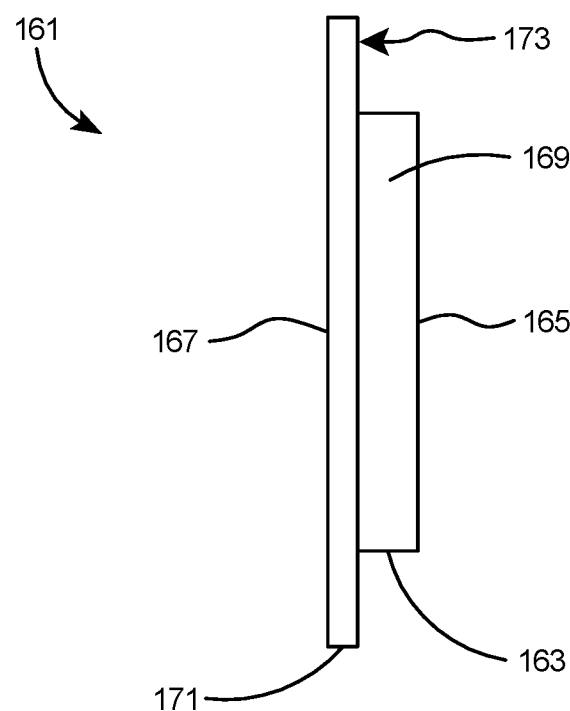
FIG. 22 is a side view of a bushing that forms a portion of the fitting of the present invention.

Referring to FIG. 22, an alternative embodiment of the rain tight fitting may also include a bushing 161. The bushing 161 includes a tubular body 163 with an inbound end 165, an outbound end 167, and a nose portion 169. A flange 171 extends outward from the outer periphery 169 of the tubular body 163 of the bushing 161 at the outbound end 167. Flange 171 includes a flat abutment surface 173. As shown in FIG. 23, in the rain tight fitting assembly the nose portion 169 of the bushing 161 will extend through bore 109 of gland nut 32 and keep the bushing centered with respect to the gland nut. In the assembly, the flat abutment surface 173 of bushing 161 engages the flat engagement surface 121 (see FIG. 16) of the gland nut 32. The bushing 161 may be constructed of metal or plastic. If constructed of plastic the bushing is preferably formed of polycarbonate. Most preferably, the bushing is constructed of zinc alloy.

With reference to FIG. 23, the preferred embodiment of the fitting 180 for PVC-MC cable includes a fitting body 22 with a sealing ring 34 and a locknut 36 on the outbound end 26 of the fitting body and an MC ring 28, grommet 28, bushing 161, and gland nut 32 on the inbound end 24 of the fitting body 22. Fingers 127 of MC ring 28 will extend into inbound channel 46 of fitting body 22. Outbound end 62 of grommet 30b seats within the base portion 125 of MC ring 28. Nose portion 169 of bushing 161 extends through opening 57 in gland nut 32 and keeps the bushing centered with respect to the gland nut. As gland nut 32 is tightened, flange 171 of bushing 161 seats against flange 155 of grommet 30b and urges fingers 127 of MC ring 28 further into inbound channel 46 of fitting body 22. Tightening locknut 36 onto outbound threads 42 and gland nut 32 onto inbound threads 44 of fitting body create a rain tight fitting 180 around a PVC-MC cable.

Referring to FIGS. 24-26, to operate the invention the installer removes an end portion of the PVC jacket 182 from the PVC-MC cable 149 to expose the armor layer 184 and removes a portion of the armor layer to expose the conductors 153. The end of the stripped cable 149 is then inserted through the loosely assembled electrical fitting 180. Gland nut 32 is then tightened upon fitting body 22 to secure the cable in a rain tight fit within the electrical fitting. Outbound end 26 of electrical cable 149 is secured to an electrical box or panel 147 by locknut 36 against sealing ring 34 and electrical fitting 180.

Figure 27:
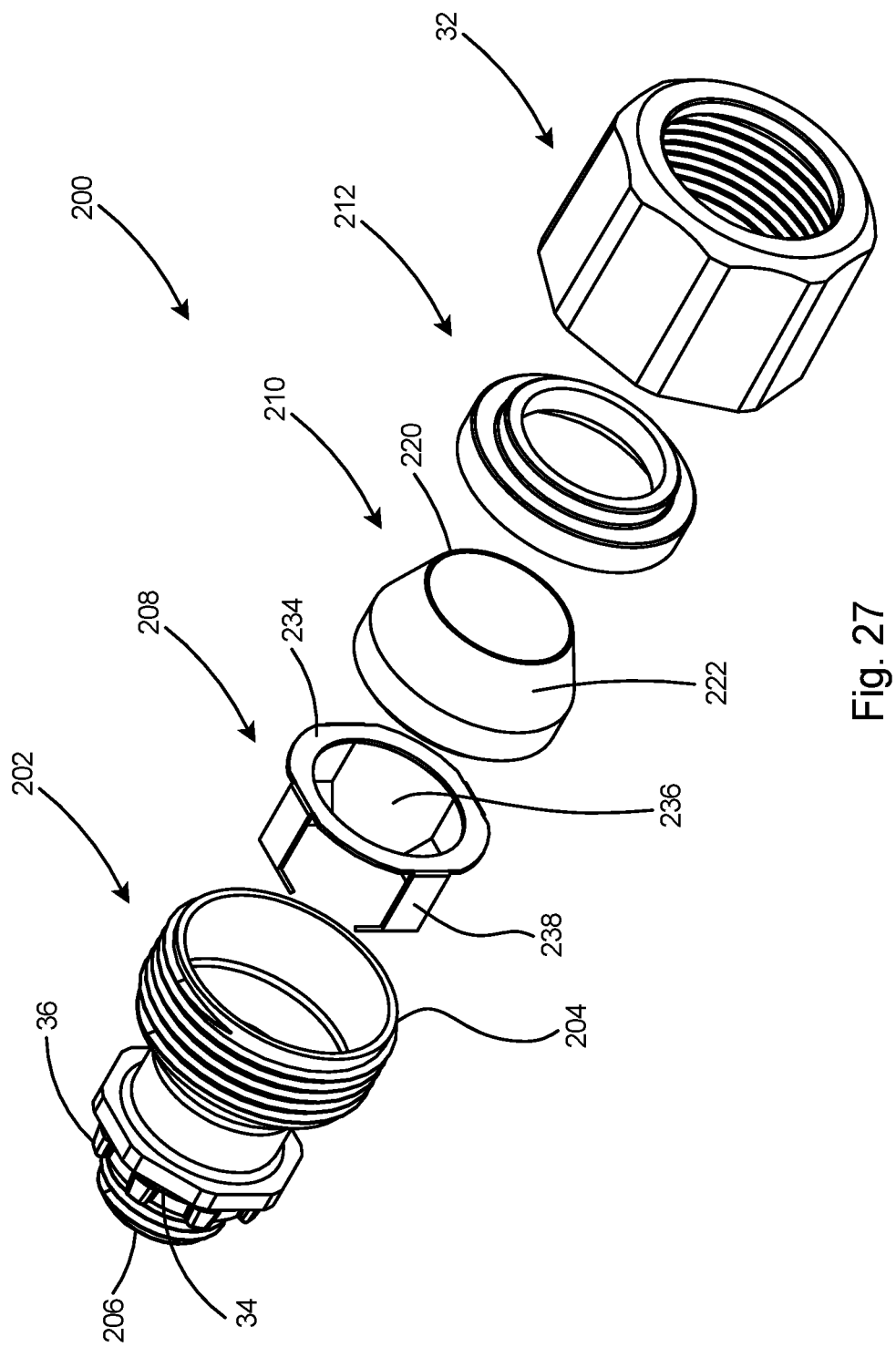
FIG. 27 is an exploded isometric view of a third and preferred embodiment of an electrical fitting for PVC-MC cable in accordance with embodiments of the invention.

With reference to FIG. 27 there is shown a third and preferred embodiment of an electrical fitting 200 for PVC jacketed Metal Clad (PVC-MC) electrical cable. The electrical fitting 200 includes a fitting body 202 having an inbound end 204 and an outbound end 206. The fitting further includes an MC ring 208, a grommet 210, and a bushing 212 secured to the inbound end 204 of the fitting body 202 by a gland nut 32 and a sealing ring 34 that will be secured to the outbound end 206 by a locknut 36 after the outbound end is connected to an electrical panel or electrical box (not shown) to create a liquid-tight and concrete-tight fit between the cable, the fitting, and the electrical box. The meaning of the term "liquid-tight" as used herein is that the fitting of the current invention has been rated as a UL listed rain-tight fitting.

Figure 28:
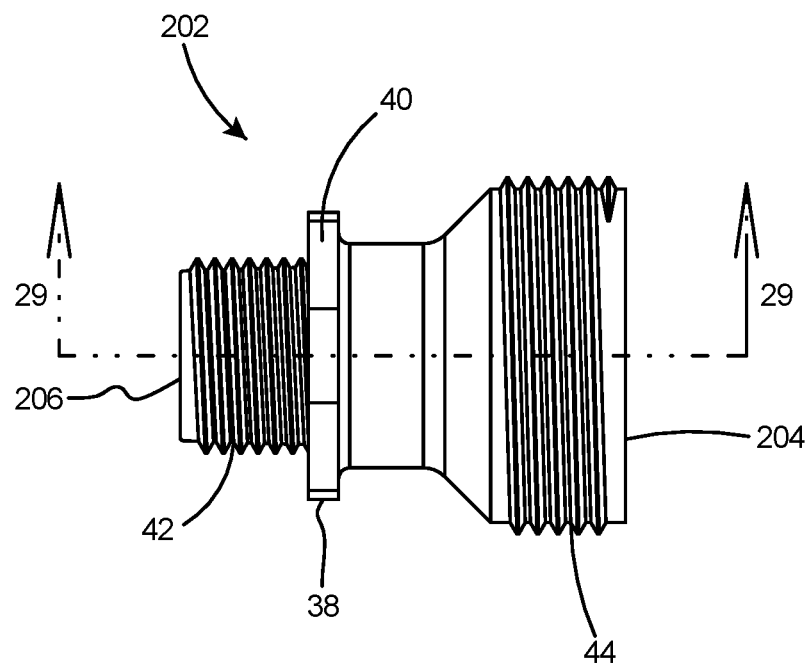
FIG. 28 is a side view of a body member which forms a portion of the fitting of FIG. 27.
Figure 29:
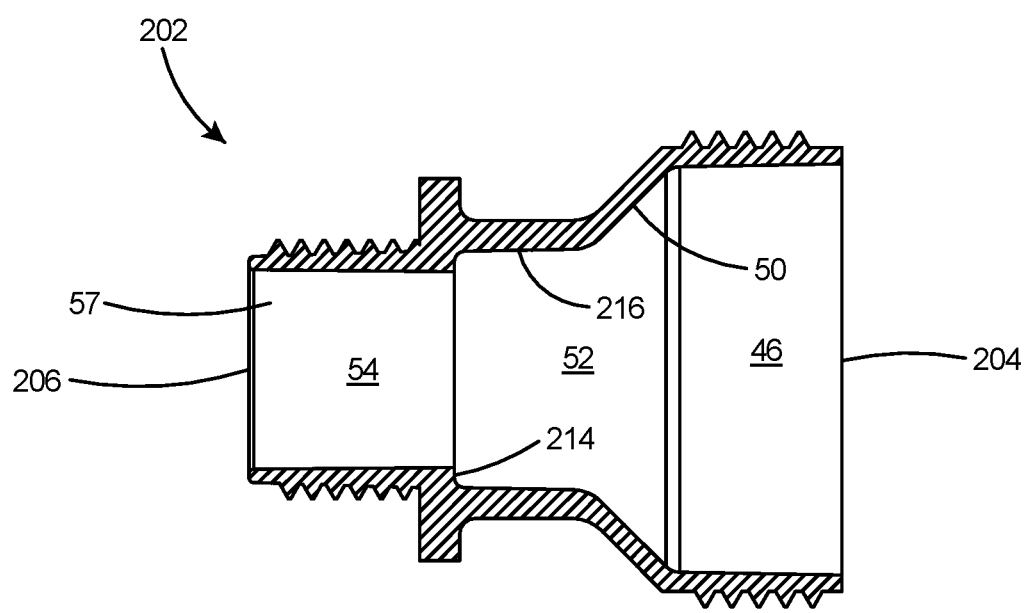
FIG. 29 is a sectional view of the fitting body taken along line 29-29 of FIG. 28.
Figure 30:
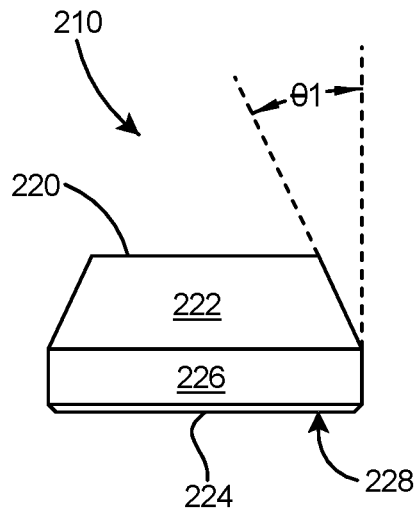
FIG. 30 is a side view of a grommet which forms a portion of the fitting of FIG. 27.
Figure 31:
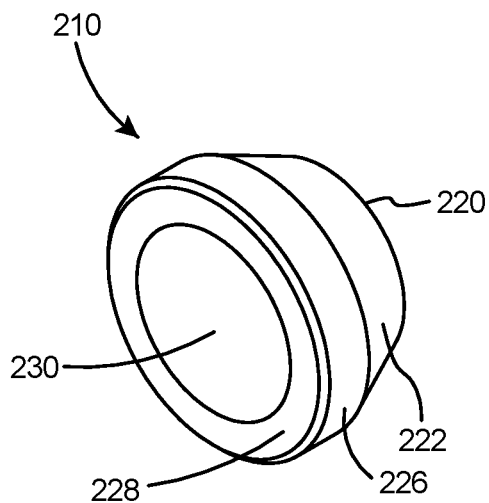
FIG. 31 is an isometric view of the grommet.
Figure 32:
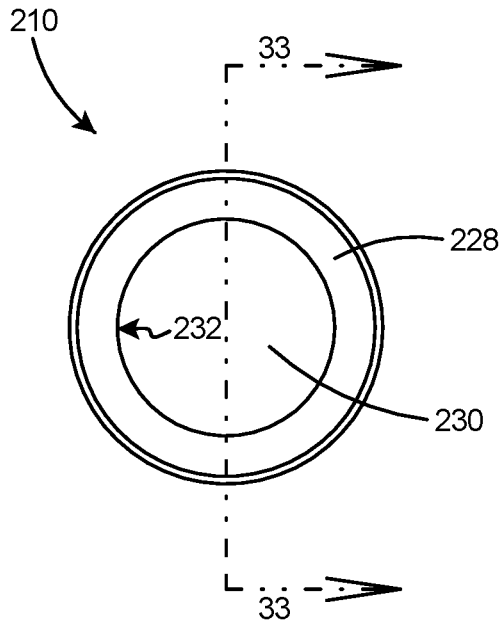
FIG. 32 is an end view of the grommet.
Figure 33:
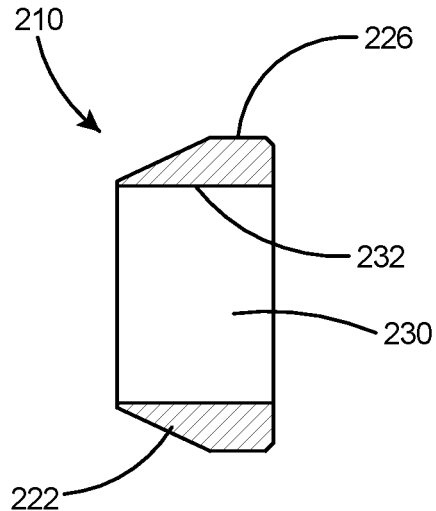
FIG. 33 is a sectional view of the grommet taken along line 33-33 of FIG. 32.

As shown in FIGS. 28-29, the fitting body 202 includes a wide inbound end 204 and a substantially narrower outbound end 206. The fitting body 202 further includes a flange 38 with flat surfaces or facets 40 thereon enabling gripping by a wrench or similar tool, a threaded nose portion 42 extending from the outbound end 206 and a threaded tubular portion 44 at the inbound end 204. The fitting body 202 includes an inbound channel 46 at the inbound end 204, a necked-down channel 48 formed by a wide ramp 50 circumscribing the interior of the body, an inner channel 52 having an inner diameter smaller than that of the inbound channel 46, and an outbound channel 54 at the outbound end 206. The body 202 includes an outbound opening 57 therein. The fitting includes a flat cable engagement surface 214 on the interior surface 216 of channel 52 and a waist portion 218 that is substantially narrower than the inbound end 204 and the flange 38.

With reference to FIGS. 30-33, a deformable grommet 210 according to the preferred embodiment includes a narrow inbound end 220 with a conical outer surface 222 and a wide outbound end 224 with a cylindrical outer surface 226 where the angle θ1 of the conical surface 226 with respect to the cylindrical surface 222 is preferably between 20 and 30 degrees. The outbound end 224 of the grommet includes a flat abutment surface 228. A bore 230 extends through the grommet 210 which includes a smooth cylindrical interior wall 232.

Figure 34:
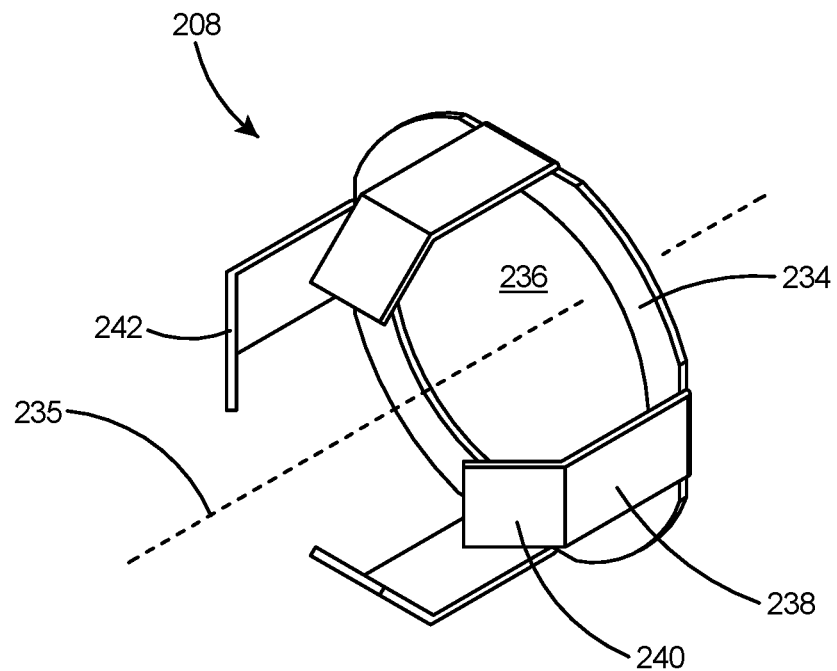
FIG. 34 is an isometric view of an MC ring which forms a portion of the fitting of FIG. 27.
Figure 35:
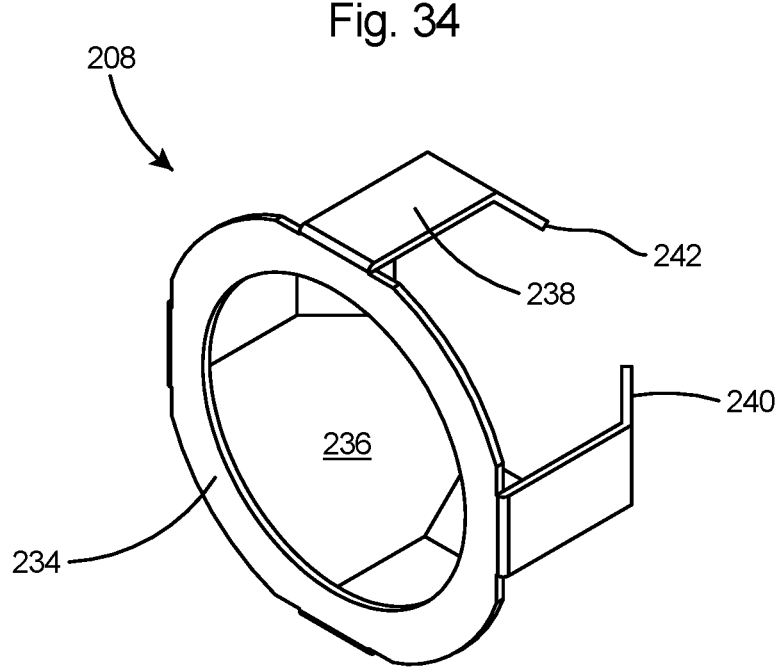
FIG. 35 is an isometric view of the MC ring from the opposing end.
Figure 36:
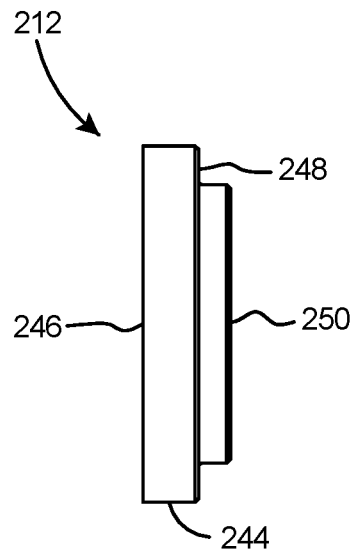
FIG. 36 is a side view of a bushing which forms a portion of the fitting of FIG. 27.
Figure 37:
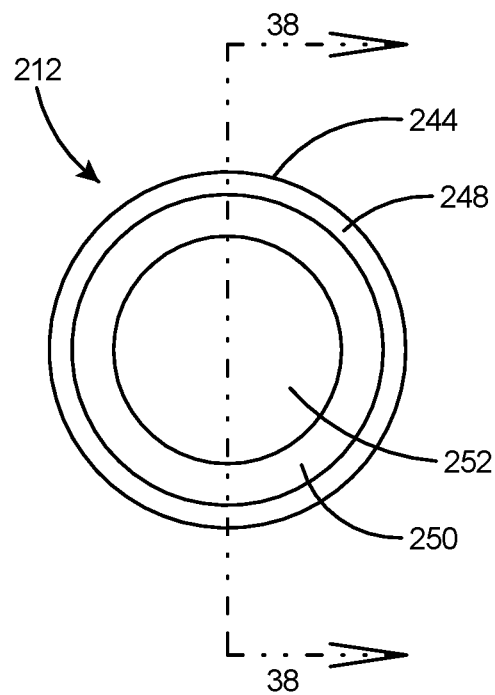
FIG. 37 is a front elevation view of the bushing.

Referring to FIGS. 34 and 35, MC ring 208 includes a ring body 234 having an opening 236 therein and one or more fingers 238 extending therefrom. Unlike the first and second embodiments of the fitting, MC ring 208 is not a split ring but preferably includes a continuous ring body 234 with fingers 238 extending from the outer edge of the ring body. In the third and preferred embodiment of the electrical fitting the ring body 234 lies in a plane perpendicular with the axial center of the ring opening 236 and the fingers 238 each lie in a plane that is at a right angle with respect to the plane of the ring body 234. The fingers 238 include end portions 240 that are bent inward of the ring body 234 toward the central axis 235 of the opening 236. The end portions 240 of the MC ring include flat distal ends 242. The MC ring 208 is a continuous ring preferably formed of spring steel. Most preferably the fingers 238 are situated at 90 degree intervals around the ring body 234.

Figure 38:
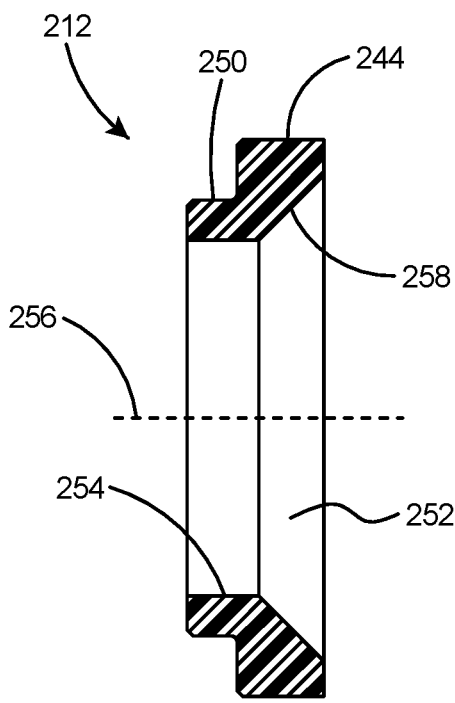
FIG. 38 is a sectional view of the bushing taken along line 38-38 of FIG. 37.
Figure 39:
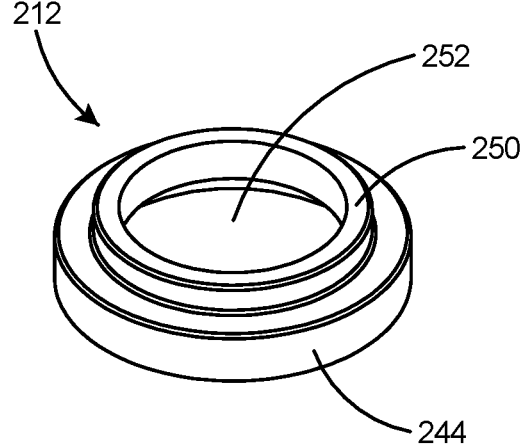
FIG. 39 is an isometric view of the bushing.

The conical outer surface 222 on the narrow inbound end 220 the flat abutment surface 228 on the wide outbound end 224 of the grommet 210, in combination with the ring body 234 of the MC ring 208 being in a plane perpendicular with the axial center of the MC ring opening 236 are critical features of the third and preferred embodiment of the electrical fitting of the present invention that lead to unexpected better sealing of the fitting against water and concrete. The earlier embodiments of the fitting included a narrowed nose portion on the grommet 30b extending into the interior of the MC ring 28 (see FIG. 23) and limiting some portion of the fingers 127 of the MC ring 28 from closing toward the central axis. With reference to FIG. 1, in the third embodiment, unexpected results have been obtained in that the fingers 238 are less impeded in closing on the installed cable and thus making required contact for grounding the MC ring 208 to the installed cable and flat abutment surface 228 of grommet 210 seats against ring body 234 of MC ring 208 creating a water-tight and concrete-tight seal. Furthermore, conical outer surface 222 at the inbound end 220 of the fitting 200 bears against conical inner surface 258 (see FIG. 38) inside bushing 212 to provide a further water-tight and concrete-tight seal at the inbound end 220 of the grommet 210.

Referring to FIGS. 36-39, bushing 212 includes a tubular body 244 having an inbound end 246 and an outbound end 248 with a collar 250 extending from the inbound end 246 of the body 244. An internal bore 252 extends through the bushing 212. The collar 250 includes an inner surface 254 that is coaxial with the center axis 256 of bore 252. Tubular body 244 includes a conical inner surface 258 that is formed to substantially match the outer periphery of the inbound end 220 of the grommet 210 (see FIG. 30). Bushing is preferably constructed of plastic and most preferably constructed of polycarbonate.

Figure 40:
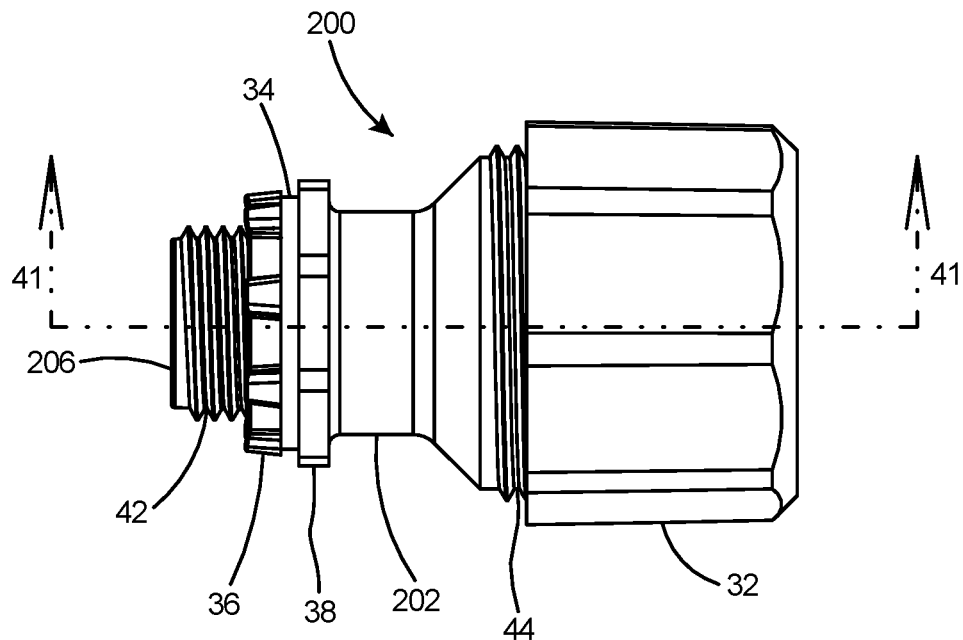
FIG. 40 is a side view of the electrical fitting of FIG. 27 in an assembled state according to the present invention.

With reference to FIG. 40, the assembled electrical fitting 200 includes fitting body 202 with gland nut 34 threaded onto the inbound end of the fitting and the locknut 36 threaded onto the threaded nose portion 42 of the fitting 200 on the outbound end 206. After being secured to an electrical box (not shown), sealing ring 34 is held flush and tight against the electrical box by the locknut.

Figure 41:
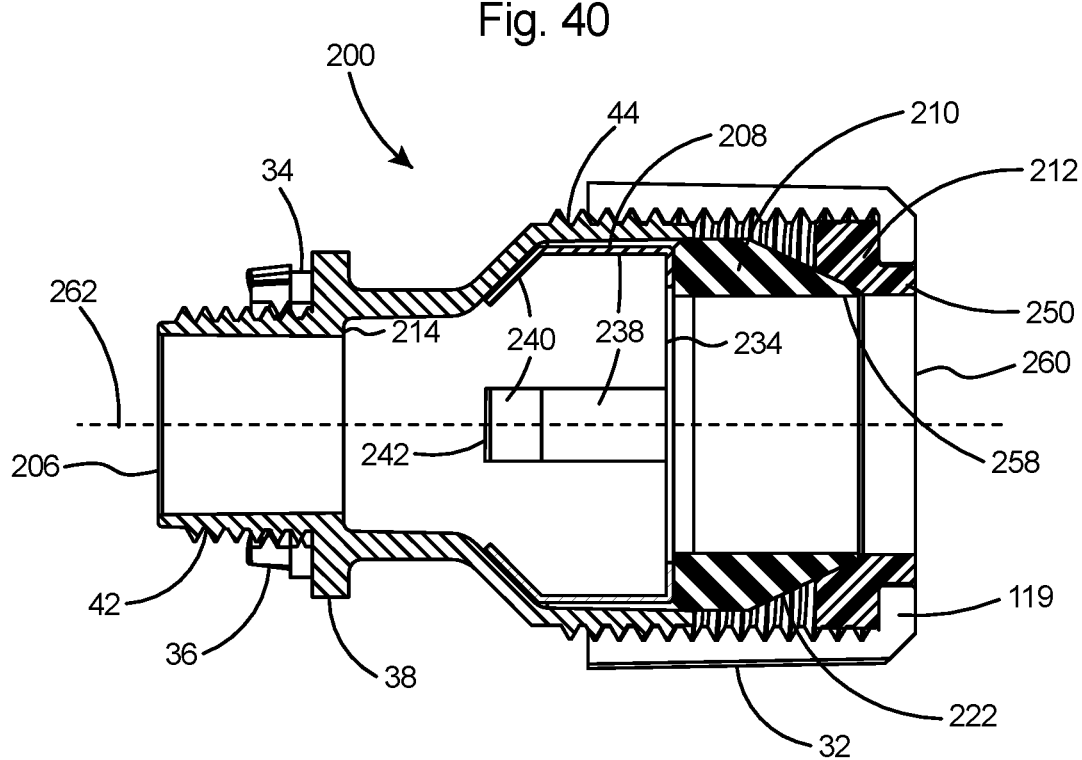
FIG. 41 is a sectional view of the assembled electrical fitting taken along line 41-41 of FIG. 40.

With reference to FIG. 41, the electrical fitting 200 is used to connect a PVC jacketed metal-clad (PVC-MC) electrical cable to an electrical box or panel (not shown). Insertion of a stripped end portion of PVC-MC cable into the inbound end 260 of the fitting along axis 262 and tightening of the gland nut 32 on the inbound end 260 urges the ring body 234 of the grommet 210 against the MC ring 208 and deforms the grommet 210 around the cable while at the same time driving the ends 242 of the fingers 238 of the MC ring tightly against the armor layer of the cable and grounding the fitting 200 to the cable. By establishing a proper grounding path with the armor, the MC ring 208 electrically grounds the cable to the fitting body 202 and holds the cable securely within the fitting 200 while the deformed grommet 210 affects a liquid-tight and concrete-tight fit between the MC ring 208, grommet 210, gland nut 32, and fitting body 202 at the inbound end of the fitting. Collar 250 of bushing 212 extends between the gland nut 32 and the PVC-MC cable further providing a weather-proof seal between the fitting and the cable at the inbound end 260 of the fitting 200. Locknut 36 and sealing ring 34 establish a liquid-tight fit against the electrical box or panel at the outbound end 206 of the fitting.

PVC-MC cable is rated for installation outdoors and in concrete. Thus electrical fitting 200 described herein is capable of forming liquid-tight and concrete-tight connections to accommodate PVC-MC electrical cable in these applications. Furthermore, the electrical fitting 200 can accommodate a wide range of cable sizes. Two nominal sizes of fitting according to the present invention can accommodate a cable size range of 14/2 to 4/3, including a cable range of 0.550-inch to 0.890-inch and an overall jacket outside diameter range of 0.670-inch to 0.990-inch.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A liquid-tight and concrete-tight electrical fitting, comprising:
    a tubular fitting body including an inbound end with an inbound bore, and an outbound end with an outbound bore;
    a tubular MC ring in said inbound bore of said fitting body;
    said MC ring including a continuous ring body with an outer edge, an opening having an axial center, and a plurality of fingers extending from said outer edge of said ring body;
    a deformable grommet disposed in said bore of said MC ring;
    a gland nut for urging said grommet and said MC ring within said inbound bore of said fitting body;
    said fingers of said MC ring having end portions thereon; and
    said end portions of said fingers projecting forward and radially inwardly from the fingers.

2. The electrical fitting of claim 1, wherein said ring body of said MC ring is in a plane perpendicular with the axial center of the opening in the MC ring.

3. The electrical fitting of claim 1, further comprising
    a locknut on said outbound end of said fitting body; and
    a sealing ring disposed between said locknut and said fitting body.

4. The electrical fitting of claim 1, further comprising a threaded portion on said inbound end of said fitting body.

5. The electrical fitting of claim 1, further comprising
    a central flange on said fitting body; and
    facets on said central flange.

6. The electrical fitting of claim 1, further comprising a ramped surface circumscribing the interior of said fitting body within said inbound bore.

7. The electrical fitting of claim 1, wherein said grommet further comprises
    a narrow inbound end; and
    a wide outbound end.

8. The electrical fitting of claim 7, wherein said grommet further comprises
    a conical outer surface on said narrow inbound end; and
    a cylindrical outer surface on said wide outbound end.

9. The electrical fitting of claim 8, wherein the conical outer surface with respect to the cylindrical outer surface is at an angle of between 20 and 30 degrees.

10. The electrical fitting of claim 7, wherein said grommet further comprises a flat abutment surface on said wide outbound end.

11. The electrical fitting of claim 3, further comprising
an inner surface on said sealing ring; and
a tab extending from said inner surface of said sealing ring to an apex.

12. The electrical fitting of claim 1, wherein said grommet is constructed of elastomeric material.

13. The electrical fitting of claim 1, wherein
the material of construction of said fitting body is selected from the group including zinc alloy, stainless steel, or plated steel; and
said MC ring is constructed of spring steel.

14. The electrical fitting of claim 1, wherein said gland nut further comprises
an inbound end, an outbound end, and an inner periphery; and
a lip including a through bore at said inbound end.

15. The electrical fitting of claim 14, further comprising
a bushing disposed between said gland nut and said grommet; and
a flange and a nose portion on said bushing.

16. A liquid-tight and concrete-tight electrical fitting, comprising:
a tubular fitting body including an inbound end with an inbound bore, and an outbound end with an outbound bore;
a tubular MC ring in said inbound bore of said fitting body;
said MC ring including a continuous ring body with an outer edge, an opening having an axial center, and a plurality of fingers extending from said outer edge of said ring body;
a deformable tubular grommet disposed in said bore of said MC ring, said deformable tubular grommet including a narrow inbound end and a wide outbound end;
a conical outer surface on said narrow inbound end of said grommet;
a gland nut for urging said grommet and said MC ring within said inbound bore of said fitting body; and
a ramped surface circumscribing the interior of said fitting body within said inbound bore, said ramped surface adapted for engaging said fingers of said MC ring.

17. The electrical fitting of claim 16, further comprising a cylindrical outer surface on said wide outbound end of said grommet.

18. A liquid-tight and concrete-tight electrical fitting, comprising:
a tubular fitting body including an inbound end with an inbound bore, and an outbound end with an outbound bore;
a tubular MC ring in said inbound bore of said fitting body;
said MC ring including a continuous ring body;
a tubular grommet disposed in said bore of said MC ring;
a gland nut for urging said grommet and said MC ring within said inbound bore of said fitting body;
a bushing disposed between said gland nut and said grommet;
a locknut on said outbound end of said fitting body;
a sealing ring disposed between said locknut and said fitting body;
said sealing ring including an inner periphery and a central axis;
a tab extending from said inner periphery on said sealing ring; and
an apex aligned along said central axis of said sealing ring.

19. The electrical fitting of claim 18, wherein said MC ring further comprises
an outer edge;
an opening having an axial center, and
a plurality of fingers extending from said outer edge of said continuous ring body.

20. The electrical fitting of claim 19, further comprising
a flat abutment surface on said grommet; and
said ring body of said MC ring is in a plane perpendicular with the axial center of the opening in the MC ring.

* * * * *